Figure 1:
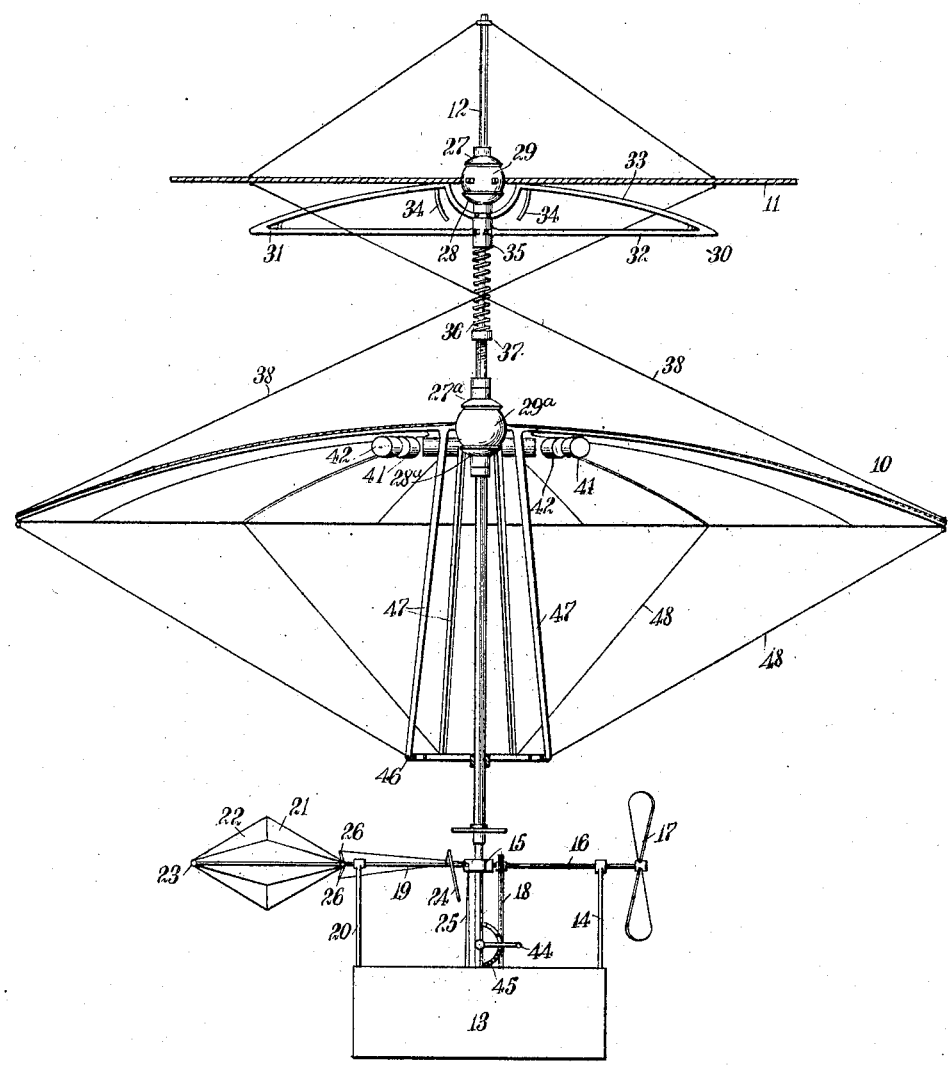

C. H. DUNCAN.
AEROPLANE.
APPLICATION FILED FEB. 17, 1910.

1,004,558.

Patented Oct. 3, 1911.

5 SHEETS—SHEET 1.

WITNESSES:

INVENTOR
Charles H. Duncan
BY Munn & Co.
ATTORNEYS

C. H. DUNCAN.
AEROPLANE.
APPLICATION FILED FEB. 17, 1910.

1,004,558.

Patented Oct. 3, 1911.
5 SHEETS—SHEET 3.

WITNESSES:

INVENTOR
Charles H. Duncan
BY
ATTORNEYS

C. H. DUNCAN.
AEROPLANE.
APPLICATION FILED FEB. 17, 1910.

1,004,558.

Patented Oct. 3, 1911.
5 SHEETS—SHEET 4.

WITNESSES:

INVENTOR
Charles H. Duncan
BY
ATTORNEYS

C. H. DUNCAN.
AEROPLANE.
APPLICATION FILED FEB. 17, 1910.
1,004,558.
Patented Oct. 3, 1911.
5 SHEETS—SHEET 5.
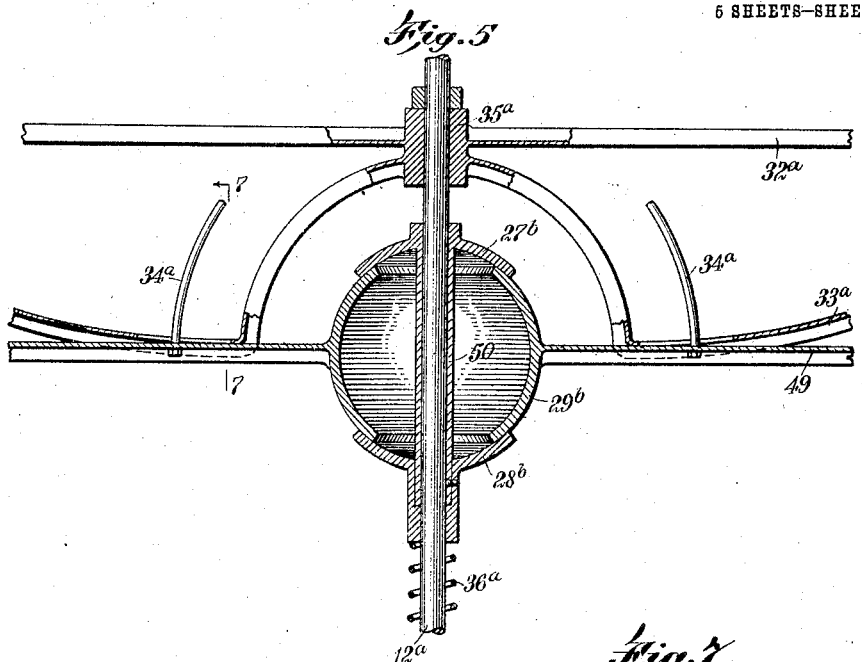
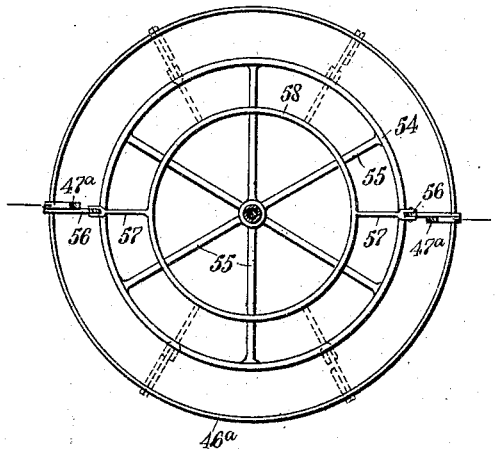
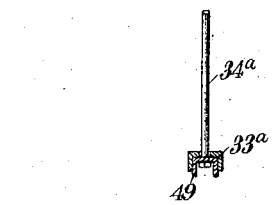
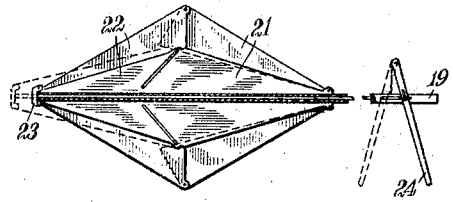
WITNESSES:
INVENTOR
Charles H. Duncan
BY
ATTORNEYS

UNITED STATES PATENT OFFICE.

CHARLES H. DUNCAN, OF NEW YORK, N. Y.

AEROPLANE.

1,004,558.  Specification of Letters Patent.  Patented Oct. 3, 1911.

Application filed February 17, 1910. Serial No. 544,388.

*To all whom it may concern:*

Be it known that I, CHARLES H. DUNCAN, a citizen of the United States, and a resident of the city of New York, borough of Manhattan, in the county and State of New York, have invented a new and Improved Aeroplane, of which the following is a full, clear, and exact description.

This invention relates to certain improvements in heavier-than-air flying machines, and more particularly to that type in which one or more planes are employed.

The main object of my invention is to so support the load from the plane that the load will hang substantially as a pendulum and will operate automatically to prevent any material tipping or tilting of the plane. The plane is free to tilt through a limited angle in respect to the vertical line maintained by the suspended load, but as soon as the plane does begin to tilt in respect to the vertical, means are brought into operation which act automatically to restore the plane to its proper horizontal position. This automatic righting of the plane may be brought about by the opening of the ports in one portion of the plane, so as to let the air pass through that portion, or it may be brought about by the mechanical tipping or tilting of a second plane in the reverse direction so as to counteract the tilting of the first plane. Both of these means may be employed or other suitable means which will secure the desired object.

A further important feature of my invention is the means employed for connecting the plane to the load supporting member or members, to permit a limited tilting, but to normally tend to prevent such tilting.

A still further important feature resides in the construction of the rudder, whereby the size of the rudder may be varied in accordance with the wind pressure or other atmospheric conditions which might affect the operation thereof.

The various features of my invention may be varied in construction and relative arrangement, without departing from the spirit of my invention, and I do not wish the specific form illustrated in the drawings to be considered in a limiting sense, but rather in an illustrative sense.

Reference is to be had to the accompanying drawings, forming a part of this specification, in which similar characters of reference indicate corresponding parts in all the figures, and in which—

Figure 2:
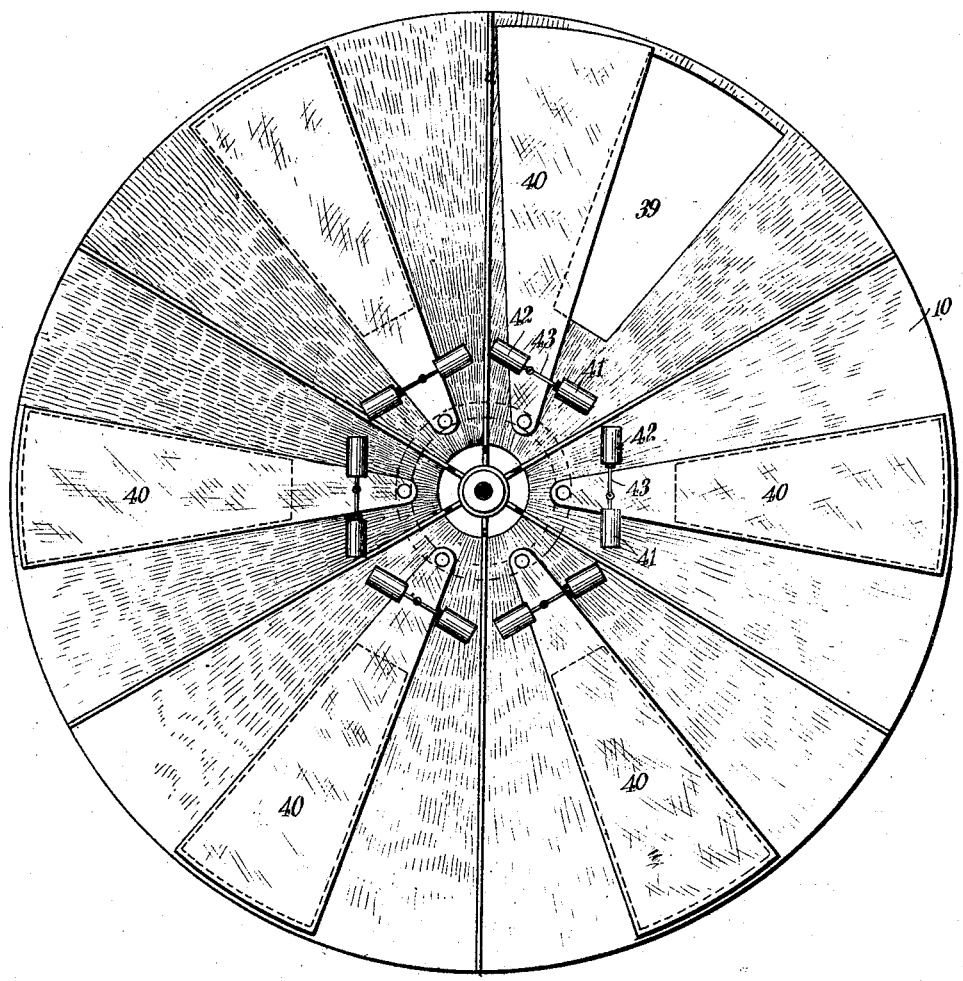
Figure 3:
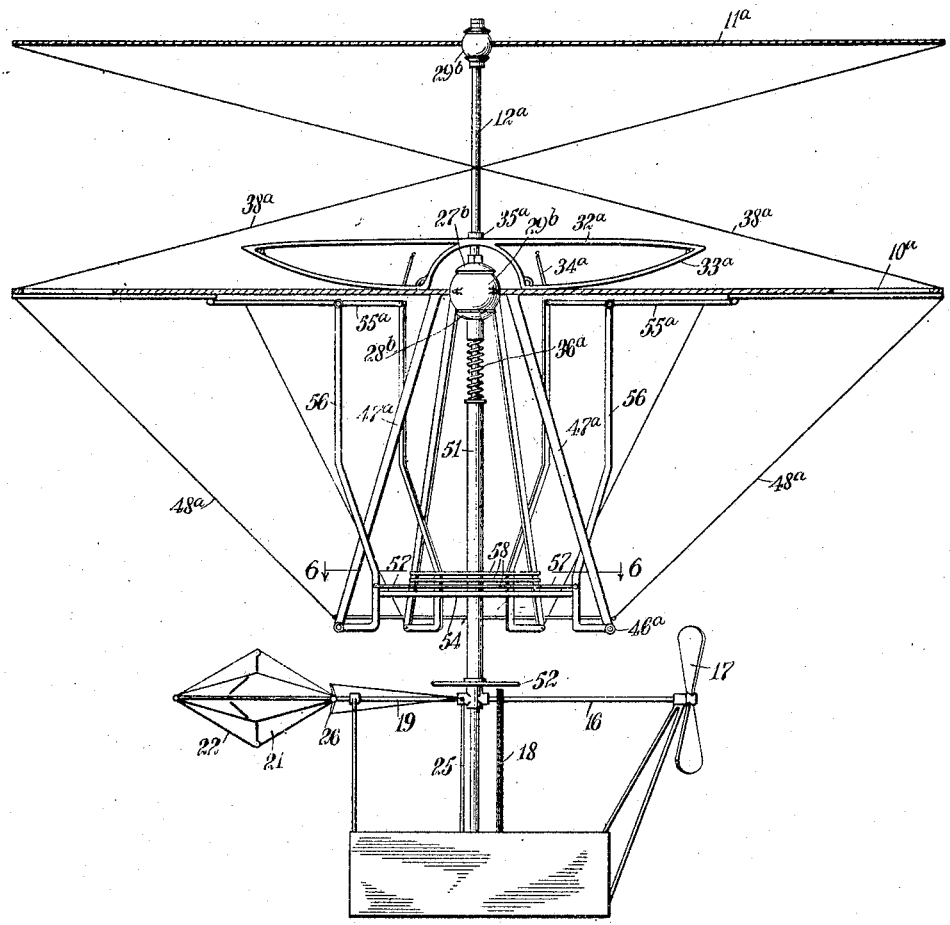
Figure 4:
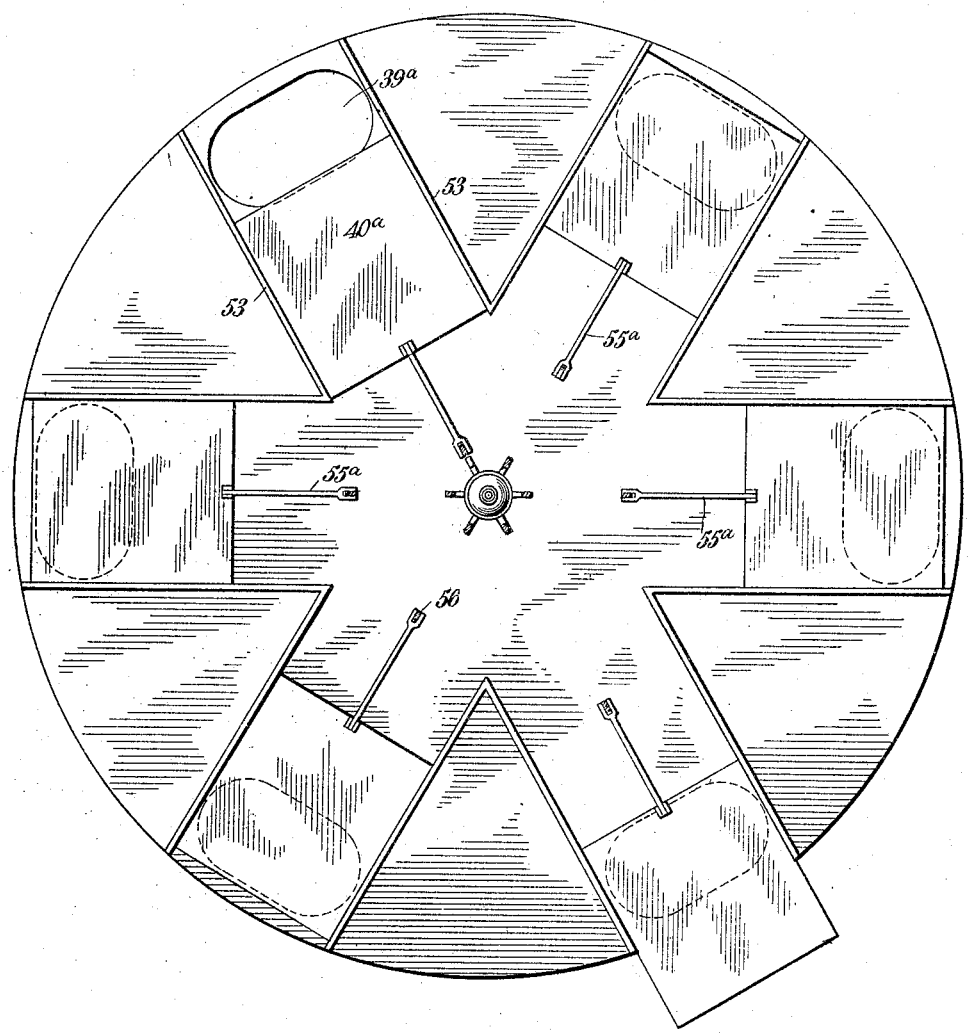

Figure 1 is a vertical section through a machine constructed in accordance with my invention; Fig. 2 is an inverted plan view of the main plane shown in Fig. 1; Fig. 3 is a vertical section through a somewhat modified form of construction; Fig. 4 is an inverted plan view of the main plane shown in Fig. 3; Fig. 5 is a sectional detail showing the connection of the load-supporting member and the plane; Fig. 6 is a transverse section on the line 6—6 of Fig. 3; Fig. 7 is a detail of one of the plane guides, taken on the section line 7—7 of Fig. 5; and Fig. 8 is a side elevation of my improved rudder.

In my improved aeroplane, I employ one or more planes of any suitable form or size, and instead of mounting the load rigid in respect to the plane, I suspend the load from the center of the plane and connect the suspending means by a form of joint which will permit the load and its suspending means to swing like a pendulum, or rather the plane is permitted to tilt to a limited extent in any direction without swinging the load. In the preferred construction, I support the load from a vertical rod, and connect the latter to the center of the plane by a ball-and-socket joint. In the specific construction illustrated in Figs. 1 and 2, I employ two planes 10 and 11, each circular in form and the plane 11 mounted above the plane 10 with the centers of the two in vertical alinement. The upper plane 11 is substantially flat, while the lower plane 10 is curved, so that all parts thereof lie in the surface of a sphere. A rod 12 extends vertically through the centers of both of the planes, and is connected to each of them by a form of ball-and-socket joint which permits a tilting of the plane in respect to the rod 12. The rod 12 constitutes the means for supporting and suspending the load from the planes. By the term "load", I mean the motor, propeller, passenger basket or car, and such other parts as do not directly contribute to the supporting of the machine in the air. These parts may assume any de sired form, but, as illustrated, there is employed a car or basket 13, secured to the lower end of the rod 12 in any suitable manner, and within this car or basket is the motor, not shown. Supported in a suitable upright 14, and in a collar 15 on the rod, is a shaft 16 carrying a propeller 17 and driven from the motor by any suitable gearing 18. Directly opposite to the propeller shaft is a rudder shaft 19 supported in a suitable upright 20 and in the collar 15.

At any suitable point on the shaft 9, preferably the rear thereof, there is provided an improved rudder, which is shown more in detail in Fig. 8. This rudder is for the purpose of balancing the machine, and has the feature of being expansible so as to vary its active surface. On the shaft 19, there is provided a plurality of radially-disposed fins 120, each of which comprises a stationary blade 121 and a pair of movable blades 21 and 22. The movable blades may be hinged together, as at 123, and may be slidingly connected to the stationary blade 121, as by means of a pin-and-slot connection 124. The blades 21 can also be pivotally connected, as at 125, to either the blades 121 or a stationary portion of the shaft 19. The other movable blades 22 may be pivotally connected to a slide 23, which is adapted to be operated in any suitable manner, as by being connected to an operating lever 24, by means of a connecting rod 126. It will thus be seen that by manipulating the lever 24, the blades 21 and 22 can be moved to positions in which they overlap the stationary blade 121 to a greater or less extent. For example, when the lever is swung into the full-line position illustrated in Fig. 8, the blades 21 and 22 will be manipulated into their outermost position, where they project to the greatest extent beyond the blades 121, exposing their fullest active surface. When the lever 24 is swung to the dotted-line position indicated in Fig. 8, the blades 21 and 22 will be slid and pivoted into the dotted-line position in which they will overlap the stationary blades 121, thereby causing the fins 120 to have their least area exposed to the action of the air. Any intermediate position between these two extremes may be had by an intermediate adjustment of the lever 24.

For tilting the rudder to steer the machine, any suitable means may be employed, as, for instance, cords 25 extending upwardly from the car and over pulleys on the collar 15, and thence outwardly along the shaft. These cords, at their outer ends, are connected to short levers 26 beyond a joint in the shaft 19, so that by pulling either cord, the entire rudder may be swung upwardly or downwardly as desired.

In the machine illustrated in Figs. 1 and 2, the rod 12, adjacent its upper end, has two collars 27 and 28 thereon, which are dished to form the opposite sides of a socket for a hollow ball 29. The plane 11 is secured to the ball, and the ball has openings within the two collars 27 and 28, so that it may rotate a short distance in any direction between the socket collars 27 and 28, and thus permit a limited tilting of the plane 11 in respect to the suspending rod 12. To permit this tilting and to automatically restore the plane to its horizontal position, I provide a skeleton disk or spider 30, the upper surface of which is curved spherically and is substantially tangential to the plane 11 at the center of the latter. This skeleton frame which may be termed a spider has a peripheral member or rim 31, a plurality of straight spoke members 32 lying in the same plane, and a plurality of curved spoke members 33, each lying in the arc of a circle. These curved spoke members 33 are directly below supporting ribs in the plane 11 and are held against lateral or rotative movement in respect thereto by suitable guides 34. The structure of these guides, as well as of the ribs and the ball-and-socket, may be substantially the same as hereinafter described in connection with the form shown in Figs. 3, 4 and 5, and as illustrated particularly in Fig. 5.

The two sets of spokes 32 and 33 are connected to a collar 35, which is free to slide longitudinally on the rod 12, but is held up against the latter by a heavy coil spring 36. As the plane 11 tends to tilt in any direction, its surface will engage with the upper curved spokes 33 at increasing distances from the rod 12, and the skeleton disk will be forced downwardly against the action of the spring 36. The greater the extent of the tilting, the greater will be the resistance to the tilting, as the compression of the spring is continuously increased. As the load or main weight is at the lower end of the shaft 12, the latter tends to hang in a substantially vertical position, and it therefore maintains the skeleton disk 30 in a substantially horizontal plane. Thus the skeleton disk automatically tends to restore the plane to its horizontal position. The tension of the spring 36 may be varied in accordance with the condition or character of the wind, by adjusting a nut or collar 37 which constitutes a stop for the lower end of the spring. If desired, means may be provided for adjusting this spring tension while the machine is in flight, although in the accompanying drawings, I have not illustrated any such mechanism.

Directly below the plane 11 is the plane 10, and this plane is provided with a ball 29$^a$ at the center, fitted between two socket collars 27$^a$, 28$^a$. The plane 10 will thus be capable of the same tilting movement as the plane 11. It is not necessary to use a second skeleton disk 30 in connection with the plane 10, as the two planes may be connected by a plurality of cords or wires 38, each extending from a point on the periphery of one plane to a diametrically opposite point on the periphery of the other plane. Thus any tilting movement of one plane is communicated to the other plane, and the spring tends to counteract or prevent the tilting movement of either. The cords play a second and even more important function; that is, when one plane is tilted by the action of the wind, the cords tilt the other plane in the opposite direction, so as to counteract the tilting effect of the first plane. The plane 10 is the main plane and the one therefore most subjected to the wind action. When one side of this plane is tilted upwardly, the cords 38 tilt downwardly the adjacent side of the plane 11, and the wind in striking the reversely tilted plane 11, tends to right the latter, and thus tends to restore both planes to their normal position independently of the action of the spring. For further tending to right the planes, I provide means whereby the air pressure will be exerted against the lower edge of the plane 10 with greater force than against the upper or raised edge. This means may be either automatically or manually controlled in its operation, and may operate either by mechanical connections or by electric connections. As shown in Fig. 2, the plane 10 is provided with a series of openings 39 about the periphery thereof, and adjacent each opening is a pivotally mounted closure 40, normally disposed over the opening and preventing the passage of air through the latter. Adjacent the center of the plane 10 are pairs of solenoid electromagnets 41 and 42, each having a common core 43, which is pivotally connected to the pivoted closure 40. By energizing these magnets, the corresponding closures may be operated to permit the free passage of air through one portion of the plane, but to prevent it from passing through another portion. In operation, the closures are normally in operative position, to prevent any air from passing through the plane, but in case a gust of wind suddenly tilts the plane to raise one edge of it, one or more of the closures adjacent that edge are operated to uncover their corresponding openings 39, so that the wind pressure against the raised edge of the plane will be reduced and will tend to restore the plane to its normally horizontal position. The circuits for these magnets may be closed automatically by the tilting of the plane, or a manually operated circuit closer may be employed. As illustrated in Fig. 1, there is a circuit closer including a pivoted lever 44 movable over a curved contact bar 45. The contact bar has separate insulated portions connected to the several electromagnets, so that any magnet may be operated by placing the lever 44 in the right position. If automatic circuit closers are employed, I preferably mount them upon a ring 46 constituting a portion of the reinforcement or bracing of the plane 10. This ring is concentric with the rod 12, but is somewhat larger, so that it may have a limited lateral movement. To the periphery of the ring is connected a plurality of bars 47, which extend upwardly to the plane adjacent the center of the latter, and a plurality of cords 48 extend from points around the ring 46 to the periphery of the plane. As the plane tilts, a portion of the ring 46 is brought nearer to the shaft 12, and this movement of the ring may be utilized to control the opening and closing of the openings in the plane in any suitable manner.

It is immaterial whether the skeleton disk be used in connection with the upper plane or in connection with the lower plane, and it is not essential that either plane be curved. In the form shown in Figs. 3 to 7, inclusive, I employ an upper plane 11$^a$ and a lower plane 10$^a$, both circular, flat, and of the same size. The plane 11$^a$ is connected to the central rod 12$^a$ by a suitable ball-and-socket joint 29$^b$, and the peripheries of the two planes are connected by diagonal cords 38$^a$. Above the plane 10$^a$ is a skeleton disk or spider, shown in detail in Fig. 5, and conformed substantially as described in connection with Figs. 1 and 2. This skeleton disk includes a pair of spokes 32$^a$ in the same plane, and a series of spokes 33$^a$ curved to lie in the surface of a sphere. These spokes are preferably channel-shaped, as shown in cross section in Fig. 7, and the plane 10$^a$ has ribs 49, which are also channel-shaped and which are mounted to lie within the channels 33$^a$. From each rib 49, a guide 34$^a$ extends upwardly through an aperture in the corresponding spoke 33$^a$, so that the parts are prevented from rotating in respect to each other. All of the spokes 32$^a$ and 33$^a$ are connected to the collar 35$^a$, which in this instance may be secured to the rod 12$^a$. Slidably mounted upon the rod are two socket collars 27$^b$ and 28$^b$, but the two are rigidly connected together by a sleeve 50 extending through the center of the hollow ball 29$^b$. A spring 36$^a$ presses upwardly against the lower collar 28$^b$, so as to raise the entire plane against the skeleton disk. As the plane tilts, the ball and its socket collars slide downwardly against the action of the spring in substantially the same manner as the skeleton disk slides downwardly in the form shown in Fig. 1. For varying the tension of the spring, the rod may be provided with an outer sleeve 51, extending downwardly to a point adjacent the car and having a hand wheel 52 for operating the sleeve to move it upwardly or downwardly.

For controlling the wind pressure against the plane, I provide the plane with a series of ports or apertures 39ª, adjacent the periphery, and for each port there is provided a closure 40ª slidable radially between guides 53. Suitable mechanism is provided whereby the closures are automatically operated upon the tilting of the plane, so that an opening adjacent the upper edge of the plane will be uncovered. The particular mechanism employed includes a system of levers and links, shown particularly in Figs. 3, 4 and 6. Extending downwardly from the plane and rigid therewith are a plurality of bars 47ª, which support at their lower ends, a ring 46ª, which latter is connected to the periphery of the plane by cords 48ª. Adjacent the ring 46ª, and of smaller diameter, is a ring 54, which is rigidly secured by suitable spokes 55 to the rod 12ª, or rather the sleeve 51 of the latter. Pivotally connected to each closure 40ª is a link 55ª, lying adjacent the under side of the plane, and a lever 56 is pivotally connected to the inner end of each link and to the ring 46ª upon the same side of the center of the machine. Each lever engages with the periphery of the ring 54, so that the latter serves as a fulcrum, and each lever is connected to the diametrically opposite lever, so that the levers will swing in pairs. The particular connecting means illustrated, includes a plurality of superposed rings 58 unattached to each other and unattached to the sleeve 51, but each having a pair of diametrically opposite arms 57 pivoted to two of the levers 56. There are as many of these rings 58 as there are pairs of levers, and each ring is connected to a separate pair, so that when the plane is tilted in any direction, the relative movement of the ring 46ª in respect to the center rod 12ª, will cause the lever 56 on the downwardly tilted side of the plane, to swing outwardly, and the ring 58 and arms 57 will draw the diametrically opposite lever 56 inwardly. The closures 40ª are of such size that an outward movement of the closure does not open the port, but an inward movement of the closure from its normal position, will open the port. Thus, as the plane is tilted, the closure on the lower side of the plane will move outwardly, but this will not permit the passage of air through the lower side of the plane, but the inward movement of the closure at the upper side of the plane will permit the air to freely pass through this upper portion, and to reduce the lifting strain of the latter. The result gained is substantially that gained in the form shown in Figs. 1 and 2; that is, air is permitted to pass through the upper or raised side of the plane.

Although the uncovering of the ports in the plane adjacent the upper side of the latter when the plane tilts is important, yet it is also very important that as the plane tilts the fulcrum about which the plane tilts, which may be termed the center of movement of the plane recedes toward one edge by the rocking movement upon the curved ribs or spokes of the skeleton disk. This is evident from the fact that the ball 29ᵇ and the collars 27ᵇ and 28ᵇ are free to slide on the rod 12ª against the tension of the spring 36ª. When the plane is in a horizontal position, it will be noted that it is substantially tangential to these curved ribs or spokes at the center of the machine, and that during the tilting movement it remains tangential, but the point of tangency moves toward one edge of the disk. By so mounting the plane, it will be seen that the edge of the plane which moves upwardly will travel through a less distance than the edge of the plane which moves downwardly. In other words, the center of the hollow ball 29ᵇ, and thus the geometrical center of the plane, is prevented from upward movement by the skeleton frame or spider, but is permitted to move downwardly by the spring 36ª. It will thus appear evident that the geometrical center of the plane must always move downwardly if the plane tilts at all, therefore, the side of the plane which moves downwardly will move about a pivotal center or fulcrum located on the opposite side of the geometrical center, and inasmuch as the surface of the skeleton frame is in the form of a sphere, this pivotal or fulcrum center will move upwardly and outwardly for an increased movement. It will thus be further evident that inasmuch as the side which moves downwardly swings with a greater radius, it will travel over a greater downward distance than the side which moves upwardly, which swings with a shorter radius. By increasing the surface of the lowered side of the wing and decreasing the lifting surface, there would come a point where the tendency or the pressure on each wing would be equal, or balanced. This shifting of the wing takes the shock off the machine, the shock being absorbed by the spring, while the other equalizing devices are operating to right the plane. The downward movement is against wind pressure, while the upward movement is usually with it, so that the excess of pressure against the portion forced downwardly tends to right the plane.

I wish it distinctly understood that the particular mechanism employed for operating the slide, so as to secure the above-mentioned automatic balancing action, is immaterial so long as the desired results are obtained.

Various changes may be made in the structure and in the details and relative arrangements of the various parts, without departing from the spirit of my invention.

Having thus described my invention, I claim as new and desire to secure by Letters Patent:

1. A flying machine having a tiltable plane and means for supporting the load therefrom at a series of successive points approaching one edge of the plane during the tilting movement of the plane.

2. A flying machine having a tiltable plane and means for supporting the load therefrom at a series of successive points approaching the rising edge of the plane during the tilting movement of the plane.

3. A flying machine having a load-carrying means, a frame connected thereto and a plane normally in engagement therewith at the center and tiltable in respect thereto to shift the point of contact toward one edge of the plane.

4. A flying machine having a load-carrying means, a frame connected thereto and a plane normally in engagement therewith at the center and tiltable in respect thereto to shift the point of contact toward the upper edge of the plane during the tilting movement of the plane.

5. A flying machine having a load-carrying means, a frame connected thereto and presenting a curved surface and a plane normally in engagement with said frame at its center and tiltable in respect thereto to rock along said curved surface.

6. A flying machine having a plane, load supporting means, connections depending from the plane to said load supporting means and permitting the plane to tilt independently of the load supporting means, and means for varying the elevation of the center of the plane in respect to the load supporting means during the tilting movement.

7. A flying machine having a plane, load supporting means, connections depending from the plane to said load supporting means and permitting the plane to tilt independently of the load supporting means, and means for lowering the elevation of the center of the plane in respect to the load supporting means during the tilting movement.

8. A flying machine having a vertical rod or mast, means for supporting the load at the lower end thereof, a plane secured at its center to said rod or mast and tiltable in respect thereto, and means for moving the center of the plane longitudinally of the rod or mast during the tilting movement.

9. A flying machine having a vertical rod or mast, means for supporting the load at the lower end thereof, a plane secured at its center to said rod or mast and tiltable in respect thereto, and means for lowering the center of the plane along the rod or mast during the tilting movement.

10. A flying machine having a rod or mast, a plane, and a ball-and-socket joint connecting said plane to said rod or mast and movable vertically along the latter.

11. A flying machine having a rod or mast, a plane and a ball-and-socket joint connecting said plane to said rod or mast and movable vertically along the latter during the tilting movement of the plane.

12. A flying machine having two superposed planes, a vertically-disposed rod or mast connected to the center of each plane, both of said planes being free to tilt in respect to the rod or mast, and connections between said planes whereby a tilting of one plane results in a tilting of the other plane in the opposite direction.

13. A flying machine having two superposed planes, a vertically-disposed rod or mast connected to the center of each plane, both of said planes being free to tilt in respect to the rod or mast, and connections between said planes whereby a tilting of one plane results in a tilting of the other plane in the opposite direction, one of said planes having the center thereof movable longitudinally of the rod or mast during the tilting movement.

14. A flying machine having two superposed planes, a rod or mast, a universal joint connecting each of said planes to said rod or mast to permit the tilting of the planes, one of said universal joints being movable relatively to the other longitudinally of the rod or mast.

15. A flying machine having a circular plane, a universal joint at the center of the plane, load supporting means connected to said universal joint whereby the planes may be tilted in respect to the load supporting means, and means arranged radially of said plane for permitting the passage of air through the plane at any point adjacent the upper edge when the plane is in any tilted position about its universal joint.

16. A flying machine having a circular plane, load supporting means, connections depending from the center of the plane to said load supporting means and permitting a limited tilting movement of the plane, said plane having a plurality of ports therein, separate closures controlling said ports, and independent means for operating each of said closures.

17. A flying machine having a circular plane, load supporting means, connections depending from the center of the plane to said load supporting means and permitting a limited tilting movement of the plane, said plane having a plurality of ports therein, closures controlling said ports, and electromagnets for controlling said closures.

18. A flying machine having a circular plane, load supporting means, connections depending from the center of the plane to said load supporting means and permitting a limited tilting movement of the plane, said plane having a plurality of ports therein, closures controlling said ports, and electromagnets carried by said plane adjacent the under side thereof for controlling said closures.

19. A flying machine having a tiltable plane, and means for varying vertically the position of the pivotal center.

20. A flying machine having a tiltable plane, and means for varying vertically the position of the pivotal center during the tilting.

21. A flying machine having a tiltable plane, and means for varying laterally and vertically the position of the pivotal center during the tilting.

22. A flying machine having a plane, load-supporting means, pivotal connections between said plane and said means, and means for vertically adjusting said pivotal connections in respect to said load-supporting means.

23. A flying machine having a plane, load-supporting means, universal connections between said plane and said means, and means for vertically adjusting said universal connections in respect to said load-supporting means.

24. A flying machine having a vertical rod or mast, means for supporting the load at the lower end thereof, a plane secured to said rod or mast and tiltable in respect thereto, and means for moving said plane longitudinally of the rod or mast.

25. A flying machine having a vertical rod or mast, means for supporting the load at the lower end thereof, a plane secured to said rod or mast and tiltable in respect thereto, and means for moving said plane longitudinally of the rod or mast during the tilting movement.

26. A flying machine having two superposed planes, a vertically-disposed rod or mast connected to the center of each plane, said planes being free to tilt in opposite directions, and connections between said planes whereby the angle of one plane in respect to the other is varied during the tilting movement.

27. A flying machine having two superposed planes, means connecting said planes at their centers and permitting said planes to tilt, and connections between said planes, whereby a tilting of one plane results in a tilting of the other plane in the opposite direction.

28. A flying machine having two superposed planes, a vertically-disposed rod or mast, universal joint connections between each plane and said rod or mast, and connections between said planes, for tilting one plane upon the tilting of the other plane.

29. A flying machine having two superposed planes, a rod or mast, and connections between each of said planes and said rod or mast, to permit the tilting of the planes; one of said connections being movable longitudinally of the rod or mast relatively to the other.

30. A flying machine having two superposed planes, a vertically-disposed rod or mast connected to each plane, both of said planes being free to tilt in respect to the rod or mast, and connections between said planes, whereby a tilting of one plane results in a tilting of the other plane in the opposite direction.

31. A flying machine having a rod or mast, a plane, and pivotal connections between said plane and said rod or mast and movable vertically along the latter.

32. A flying machine having a tiltable plane provided with a series of ports therein about the periphery thereof, a series of independent closures for said ports, and means for automatically operating said closures during the tilting of the plane, to permit the passage of air through the plane adjacent the upper edge thereof.

33. A flying machine having a plane, a spider adjacent said plane and presenting a curved surface in rocking engagement with the plane, and a spring tending to hold said spring and said spider in engagement with each other.

34. A flying machine having a vertical rod or mast, and two members mounted thereon, one of said members comprising a spider, and the other of said members comprising a plane, and one of said members being movable along said rod or mast relatively to the other.

35. A flying machine having a vertical rod or mast, and two members mounted thereon, one of said members comprising a spider and the other of said members comprising a plane, and one of said members being movable along said rod or mast relatively to the other during a tilting of the plane.

36. A flying machine having a vertical rod or mast, two members mounted thereon, one of said members comprising a spider and the other of said members comprising a plane, and one of said members being movable along said rod or mast relatively to the other, and a spring tending to prevent said movement.

37. A flying machine having a rod or mast, and two members mounted thereon, one of said members presenting a curved surface and the other of said members presenting a flat surface opposed thereto, one of said members comprising a plane tiltable under wind pressure and having rocking engagement with the other member.

38. A flying machine having a rod or mast, two members mounted thereon, one of said members presenting a curved surface and the other of said members presenting a flat surface opposed thereto, one of said members comprising a plane tiltable under wind pressure and having rocking engagement with the other member, and a spring normally tending to prevent tilting movement.

39. A flying machine having a plane tiltable under wind pressure, and a spider adjacent thereto and presenting a curved surface over which said plane may rock.

40. A flying machine having a plane tiltable under wind pressure, and a spider adjacent thereto and presenting a curved track along which said plane may rock.

41. A flying machine having a plane tiltable under wind pressure, a spider adjacent thereto and presenting a curved surface over which said plane may rock, and a guide for preventing a rotation of said plane about a vertical axis.

In testimony whereof I have signed my name to this specification in the presence of two subscribing witnesses.

CHARLES H. DUNCAN.

Witnesses:
CLAIR W. FAIRBANK,
PHILIP D. ROLLHAUS.